May 19, 1970      J. L. LANSCH      3,513,353
VOLTAGE MONITORING CIRCUIT
Filed Aug. 17, 1967
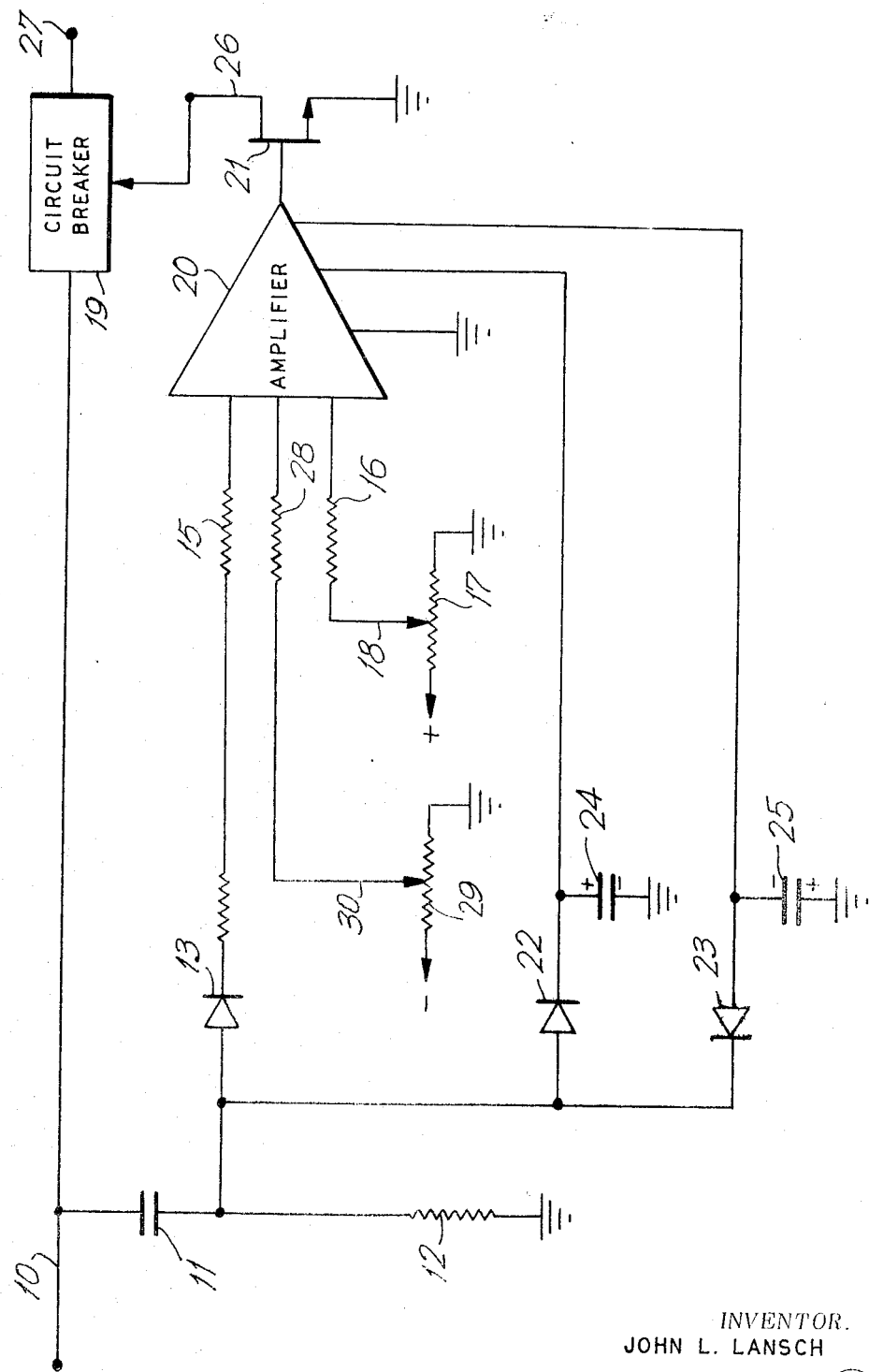
INVENTOR.
JOHN L. LANSCH

United States Patent Office 3,513,353
Patented May 19, 1970

3,513,353
VOLTAGE MONITORING CIRCUIT
John L. Lansch, Elm St., Upper Nyack, N.Y.
Filed Aug. 17, 1967, Ser. No. 661,404
Int. Cl. H02h 3/22
U.S. Cl. 317—31          5 Claims

ABSTRACT OF THE DISCLOSURE

A voltage monitoring circuit for sensing the change in voltage magnitude of AC line by detecting a portion of the voltage through a capacitive coupling and comparing that voltage with one or more fixed reference voltages so that departures from the reference voltage will cause the circuit to rapidly disconnect the line from the load. The circuit utilizes a reference amplifier which compares the rectified peak line voltage with a reference voltage and turns on a silicon control rectifier when the line voltage departs from the reference voltage so that the silicon control rectifier may actuate a circuit breaker to interrupt the power in the AC line.

---

This invention relates to an improved voltage monitor for detecting variations in the voltage of AC power lines.

More specifically, this invention relates to a capacitively coupled AC voltage monitor for detecting departures in voltage from a preset reference voltage and actuating a circuit breaker when voltage conditions are exceeded.

Conventional voltage monitoring circuits designed for detecting under and over voltage conditions in power lines generally employ a large number of components to compare the line voltage with a fixed reference voltage and actuate a circuit breaker under abnormal voltage conditions. For many voltage monitoring applications, the conventional circuits have been found undesirable because they are slow acting and unreliable in operation. The conventional circuits are generally transformer-coupled to the AC power line through a voltage step-down transformer so as to produce at its output a voltage which represents a fractional portion of the magnitude of the line voltage. When voltage transients appear on the AC line, such as during switching operations, these step-down transformers because of their slow response times and saturation characteristics fail to register the presence of the transient voltage to enable the voltage monitoring circuit to disconnect the load from the line. As a result of the slow acting circuits, the voltage transients often cause destruction to the load connected to the AC line.

Accordingly, the present invention provides a high speed, solid-state voltage monitoring circuit which is capacitively coupled to the AC line and is capable of rapidly disconnecting the load from the line for overvoltage and transient conditions. The monitoring circuit, according to the invention, which utilizes a minimum number of components for high reliability consists of a reference amplifier, having one input capacitively coupled to the AC power line to be monitored and having its other inputs connected to voltage reference sources of comparison between the line and the reference voltage. The output of the reference amplifier is connected to a solid-state switch such as a silicon control rectifier. The output of the silicon control rectifier is connected to a conventional circuit breaker connected in series with the power line and located between the load and the power source. The circuit also includes a DC power supply for providing positive and negative potentials to the reference amplifier. Due to its solid-state construction and its capacitive coupling to the AC line, the monitoring circuit of the invention is capable of high-speed operation in disconnecting the load from the line during the occurrence of voltage transients.

It is therefore an object according to the present invention to provide a voltage monitoring circuit which is capable of high speed operation during the occurrence of voltage disturbances.

It is another object according to the present invention to provide a voltage monitoring circuit which is capacitively coupled to an AC line for high speed detection and removal of the load from the line during the occurrence of voltage changes.

It is still a further object according to the present invention to provide a voltage monitoring circuit which is simple in design, inexpensive to manufacture and reliable in operation.

Other features and objects of the present invention will become apparent from the following detailed description considered in connection with the accompanying drawing which discloses an embodiment of the invention. It should be understood, however, that the drawing is designed for the purpose of illustration only and not as a definition of the limits of the invention as to which reference should be made to the appended claims.

The drawing is a schematic diagram of one embodiment of the voltage monitoring circuit according to the invention.

Referring to the drawing there is shown a single phase AC power line 10 terminating in a circuit breaker 19 connected in series therewith. Connected to ground potential from power line 10 is the series combination of capacitor 11 and resistor 12, the values of which depend upon the frequency and voltage magnitude of the power of line 10. Connected intermediate capacitor 11 and resistor 12 is half-wave rectifier 13 which detects a portion of the voltage magnitude of line 10. The output of rectifier 13 contains the positive half power cycles of the voltage portion of line 10 and is connected through resistors 14 and 15 to the input of reference amplifier 20. Reference amplifier 20 may consist of a solid-state modular construction, such as the integrated circuit amplifier uA710C, or the equivalent. Also connected intermediate capacitor 11 and resistor 12 are rectifier diodes 22 and 23 and capacitors 24 and 25, respectively, which produce positive and negative potentials to serve as a direct current power source for amplifier 20.

Amplifier 20 is also provided with two reference potential sources which may be preset to the upper and lower voltage reference potentials. The upper limit reference potential is connected through resistor 16 to potentiometer 17 and adjusted by means of sliding arm 18. The lower limit reference potential is connected through resistor 28 to potentiometer 29 and adjusted by means of sliding arm 30. The open terminals of potentiometers 17 and 29, marked + and − respectively, may be connected through Zener reference diodes to the outputs of diodes 22 or 23, a connection that is well-known to those skilled in the art. The output of amplifier 20 is connected to the control grid of silicon control rectifier (SCR) 21 which performs the switching operation for circuit breaker 19 in response to the output of amplifier 20. Circuit breaker 19, which is controlled by output 26 of SCR 21, may consist of a conventional relay actuating device, a pair of high current SCR's, or a triac switch. The output 27 of circuit breaker 19 is connected to a load, such as an AC motor, transformer, or the like.

When power is applied to AC line 10, amplifier 20 detects through its input connected to resistor 15 the peak voltage of the positive half cycles of AC power coupled through capacitor 11 and appearing at the output of diode 13. Potentiometer arm 18 is adjusted to produce at the input of amplifier 20 a reference voltage slightly higher than the peak detected voltage of line 10, while potentiometer arm 30 is adjusted so that its reference potential appearing at the input of amplifier 20 will be slightly less than the detected peak voltage. Therefore, any departure in the detected peak voltage either greater or less in magnitude than that set on reference potentiometers 17 and 29 will pass through amplifier 20 and turn "on" SCR 21 and open circuit breaker 19. The circuit according to the invention is particularly sensitive to switching transients which occur on AC line 10 at a frequency higher than line frequency and which often have destructive effects on the load connected to output 27. Since the circuit employs capacitive coupling to the input of amplifier 20, switching transients will be immediately coupled to the input of amplifier 20 without any time delay so as to enable SCR 21 to rapidly disconnect the load from the line. Likewise, in a similar manner, disturbances in line 10 which cause the line voltage to decrease in magnitude below the preset reference voltage of potentiometer 29 will cause SCR 21 to actuate circuit breaker 19 and release the load from the line.

Although the voltage monitoring circuit according to the invention has been shown in its simplest form, it is obvious to those skilled in the art that other variations in design may be employed. For example, a full-wave rectifier circuit consisting of four diodes may be substituted for diode 13 so that two positive voltage peaks may be detected at the input of amplifier 20 for each complete cycle of the line voltage. It is also obvious that the polarity of diode 13 may be reversed, together with the polarity of potentiometers 17 and 29 so that the peak negative voltage may be detected in a similar manner. Therefore, while only a single embodiment of the present invention has been shown and described, it will be understood that many changes and modifications may be made thereunto without departing from the spirit and scope of the invention.

What is claimed is:

1. A voltage monitor circuit for detecting the departure in voltage magnitude of an AC line comprising:
   at least one capacitive coupling connected to said AC line,
   at least one diode connected to the output of said capacitive coupling for converting voltage fluctuations into a DC potential,
   solid-state amplifier means having its input connected to the output of said diode,
   reference potential means connected to the input of said amplifier means and preset to a fixed reference voltage so that said amplifier means will produce a signal at its output when the input signal departs from the fixed reference voltage, and
   switch means connected to the output of said amplifier means for disconnecting said AC line from the load in response to the amplifier means output.

2. The circuit as recited in claim 1 wherein said switch means comprises a silicon control rectifier coupled to the output of said amplifier and a circuit breaker inserted in series connection between said line and the load and responsive to the output of said silicon control rectifier.

3. The circuit as recited in claim 2 wherein said reference potential means comprises at least one potentiometer having its movable arm connected to the input of said amplifier and having its winding connected to a fixed reference potential.

4. The circuit as recited in claim 3 additionally comprising a DC power source having its input connected to said capacitive coupling and having its output coupled to said amplifier.

5. The circuit as recited in claim 4 wherein said DC power source includes a positive and negative halfwave rectifier supply.

References Cited

UNITED STATES PATENTS 3,166,678    1/1965    Fleshman    328—150 X
3,214,640    10/1965    Mills    317—50 X JAMES D. TRAMMELL, Primary Examiner U.S. Cl. X.R.

317—33, 50; 307—235; 328—150